United States Patent
Bétéri et al.

(10) Patent No.: US 8,241,453 B2
(45) Date of Patent: Aug. 14, 2012

(54) METHOD AND APPARATUS FOR MANUFACTURING FIBRE-REINFORCED HOSES

(75) Inventors: Gyula Bétéri, Érd (HU); Imre Füstös, Algyö (HU); Tamás Katona, Algyö (HU); Elemér Lantos, Budapest (HU); Tibor Nagy, Budapest (HU)

(73) Assignee: ContiTech Rubber Industrial Gumiipari Kft., Szeged (HU)

( * ) Notice: Subject to any disclaimer, the term of this patent is extended or adjusted under 35 U.S.C. 154(b) by 118 days.

(21) Appl. No.: 12/989,687

(22) PCT Filed: Apr. 21, 2009

(86) PCT No.: PCT/HU2009/000034
§ 371 (c)(1),
(2), (4) Date: Oct. 26, 2010

(87) PCT Pub. No.: WO2009/133417
PCT Pub. Date: Nov. 5, 2009

(65) Prior Publication Data
US 2011/0041985 A1    Feb. 24, 2011

(30) Foreign Application Priority Data
Apr. 29, 2008   (HU) ...................................... 0800284

(51) Int. Cl.
*B65H 81/08*    (2006.01)
(52) U.S. Cl. ........ 156/149; 156/148; 242/430; 242/443; 242/443.1; 242/444
(58) Field of Classification Search .................. 156/148, 156/149; 242/430, 437, 438, 443, 443.1, 242/444, 550
See application file for complete search history.

(56) References Cited

U.S. PATENT DOCUMENTS

| | | | | |
|---|---|---|---|---|
| 3,234,721 A | * | 2/1966 | Carter | 156/431 |
| 3,983,912 A | * | 10/1976 | Iannucci | 140/149 |
| 4,741,794 A | * | 5/1988 | Antal et al. | 156/431 |

* cited by examiner

*Primary Examiner* — Khanh P Nguyen
*Assistant Examiner* — John Blades
(74) *Attorney, Agent, or Firm* — Kaplan Breter Schwarz & Ottesen LLP

(57) ABSTRACT

The object of the invention is a method for building hoses reinforced with spirally laid fibers, where the hose under construction (3) undergoes both rotation and advancing motion relative to the laying head (12), and where the reinforcing fibers are unwound from drums (14). The drums (14) are rotated about two axes, the first axis being the principal axis of the drums (A) and the second axis (B) being nearly parallel with the direction in which the fibers are unwound, where the direction of rotation of the drums (14) about the second axis (B) is the same as the direction in which the hose under construction (3) is rotated. The apparatus for carrying out the method comprises a laying head (12) and a drum support platform (15), where the hose under construction (3) undergoes both rotation and advancing motion relative to the laying head (12), and where the reinforcing fibers (10) are unwound from drums (14) through a circular fiber guide (1) The further object of the invention is a method for building hoses reinforced with spirally laid fibers, wherein the reinforcing fibers (10) are laid on the hose surface through a rotating self-adjusting circular fiber guide (2) arranged substantially coaxially with the hose. The invention also relates to an apparatus for carrying out the above method.

9 Claims, 4 Drawing Sheets

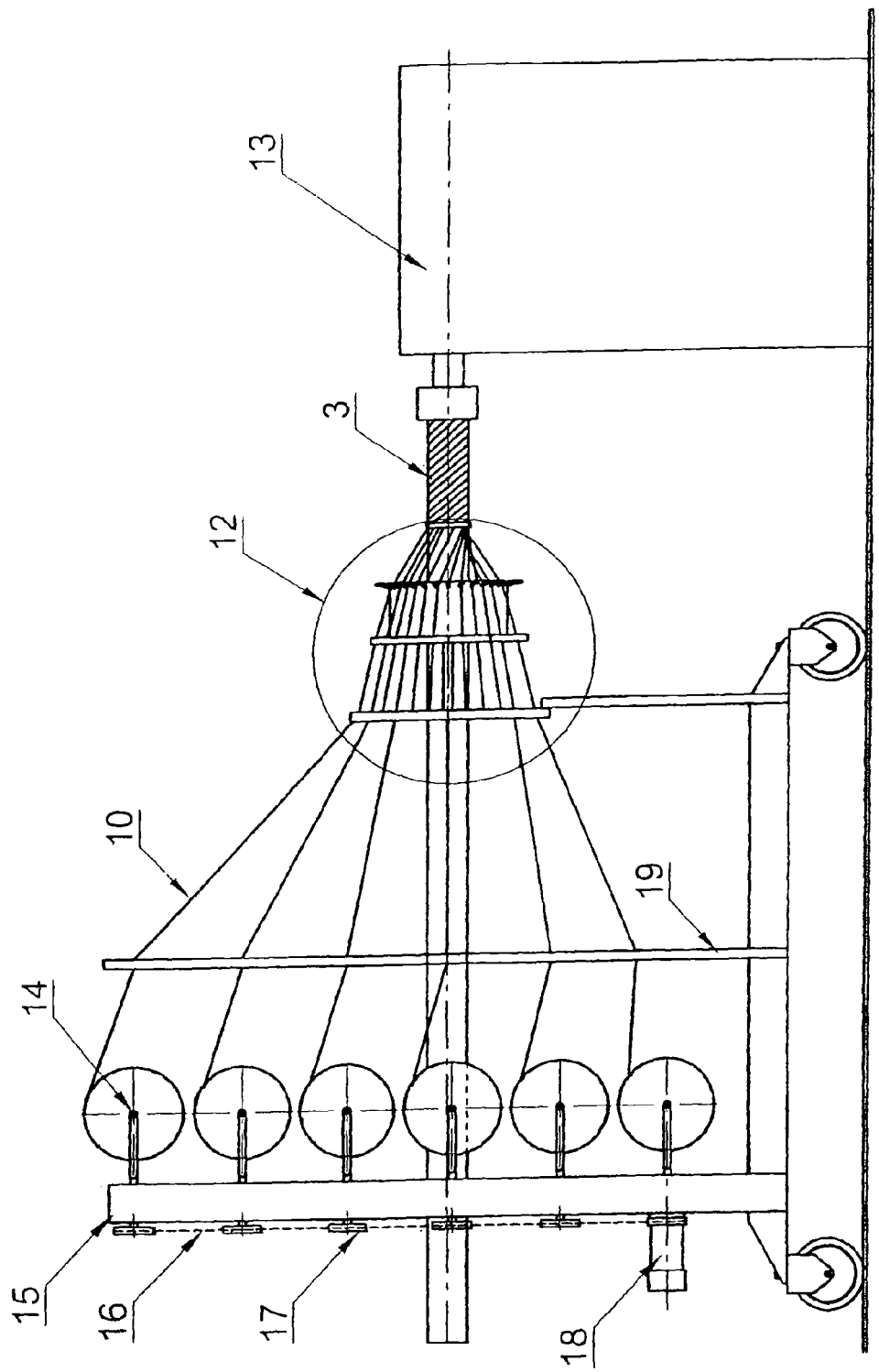

Figure 3:
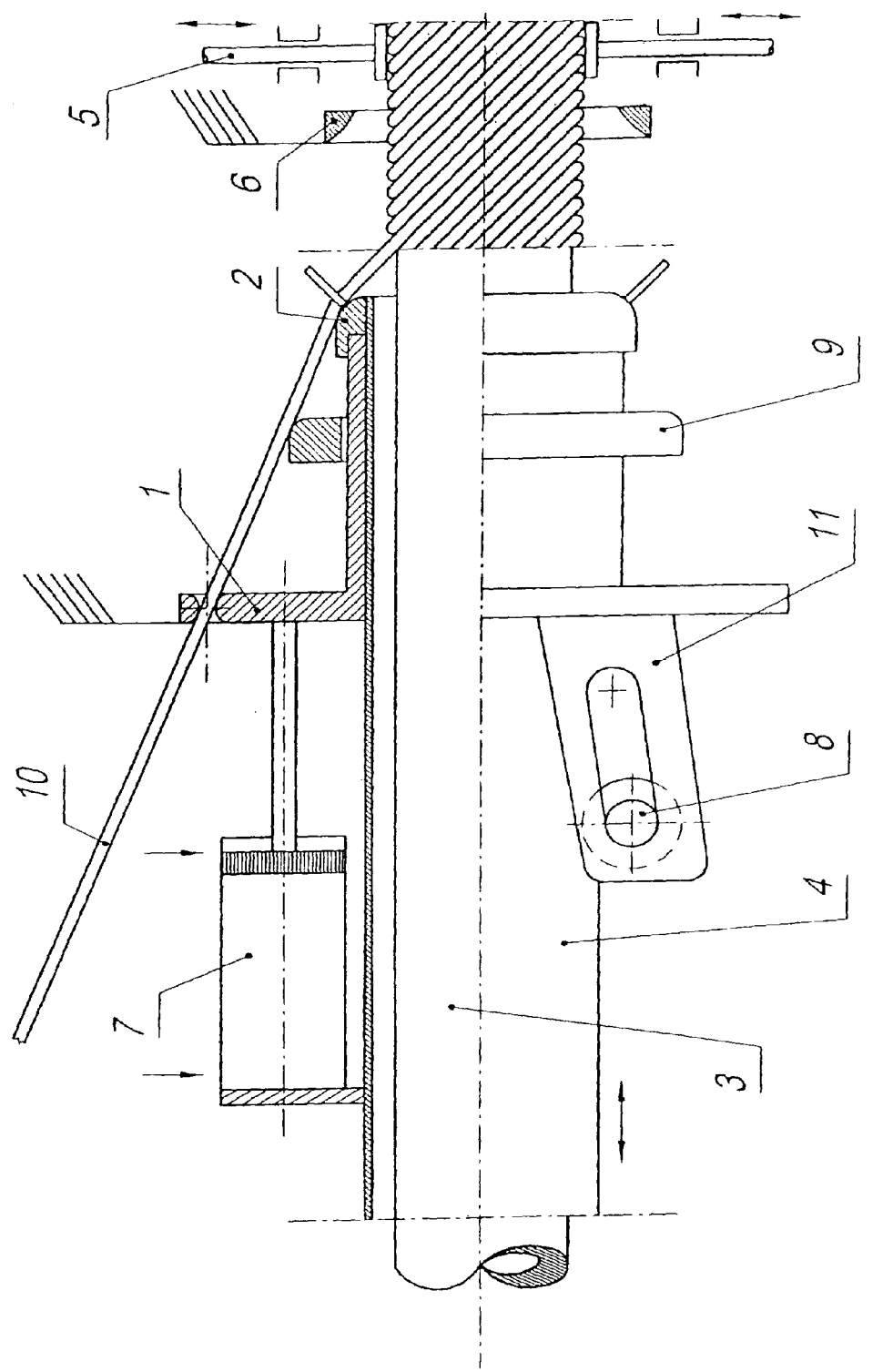

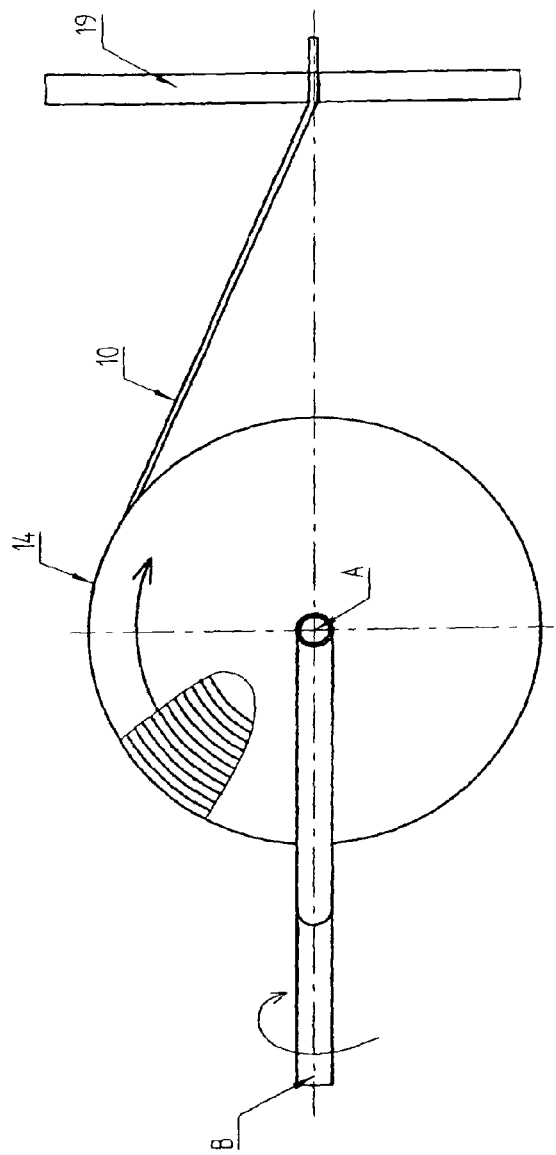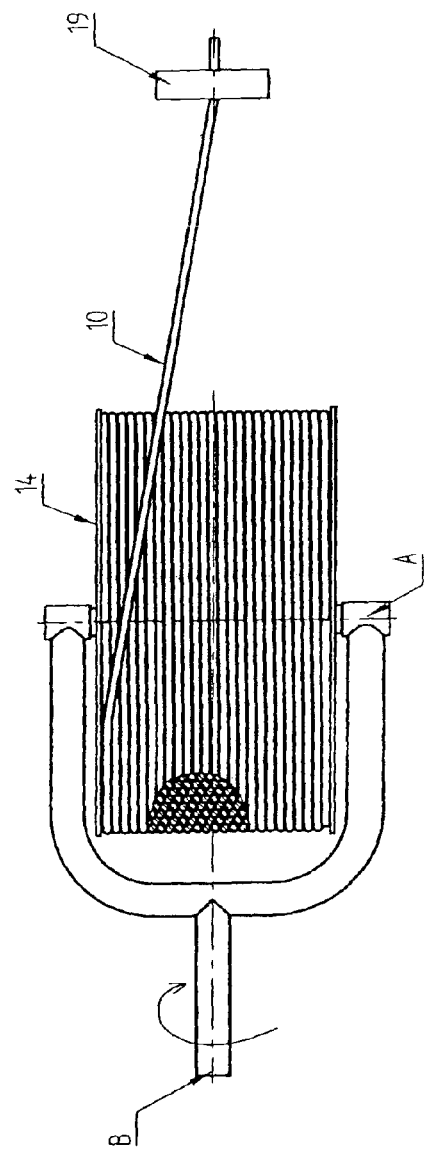
Fig. 2/a
Fig. 2/b

METHOD AND APPARATUS FOR MANUFACTURING FIBRE-REINFORCED HOSES

The object of the invention is a method and apparatus for manufacturing fibre-reinforced hoses, particularly high-pressure hoses comprising spirally laid reinforcing plies.

High-pressure fibre-reinforced hoses, particularly of larger-diameter, are often referred to in literature as flexible pipes to distinguish them from general application industrial hoses and from tyre inner tubes.

Flexible pipes enable the flow of fluids or gases between two connection points that are able to move relative to each other. Accordingly, flexible pipes are used in the offshore oil industry, where they have to meet a complex set of requirements, the most important of which is pressure retention. This means that flexible pipes have to withstand high working pressures even above 1000 bar. Also, the pipes must resist the chemical effects of the medium they carry, and must handle stresses caused by the diffusion of the carried medium and by decompression. They must bear bending and axial loads placed on them by the movement of the interconnected apparatus and by the waves of the sea. Finally, the pipes also have to resist environmental effects present in depths of several hundred or even several thousand metres below sea level.

High pressure fibre reinforced hoses may contain several layers performing different functions, for example sealing against the internal fluid, load distribution, vibration damping, external mechanical-protection and load bearing layers. To counteract the forces arising from internal and external pressure, and from axial and bending loads, multiple reinforcing plies are included in such hoses. In some cases as much as six reinforcing plies are applied. These reinforcing plies are made of a number of spirally laid reinforcing fibres. It should be noted that reinforcing fibres may be either twisted or untwisted. In this specification the term "strand" is used to refer specifically to twisted reinforcing fibres, while the terms "wire" and "wire laying" are used to refer to steel strands applied as reinforcing fibres. Also, high-pressure fibre reinforced hoses are often referred to in this specification as "hoses", and reinforcing ply fibres as simply "fibres".

Apparatus commonly used for laying reinforcing plies comprise drums or spools from which the reinforcing fibres are unwound. Drums and spools perform the same function: being able to rotate about an axis perpendicular to the direction in which the fibres are pulled off they allow the reinforcing fibres to unwind. Drums and spools differ essentially only in their size. In the profession, larger spools are usually called drums. In the context of this invention drums and spools are not differentiated, and the term "drum" is used throughout the specification to mean either drum or spool.

The hose under construction and the fibre laying assembly undergo both rotating and translatory (advancing) motion relative to each other. One well known method of laying reinforcing fibres is that the hose undergoes only advancing motion, while the drums are rotated around it. In an alternative solution, the hose undergoes advancing and rotating motion at the same time, while the drums are rotated only about their own axis and the fibre laying assembly is stationary. Such a solution is explained in document HU 183 564, and the corresponding British patent GB 2,107,421 (A).

The hose is often built (i.e. manufactured) on a rigid mandrel, but the above referenced patent specification and document HU 183 565 (corresponding U.S. Pat. No. 4,741,794) report a solution where a rigid mandrel is not necessary. The apparatus explained in document HU 206 652, where the hose undergoes only rotation while the fibre laying assembly advances and the drums are rotated about their own stationary axis, can be regarded as a variant of the above solutions. This solution makes it possible for all stages of the hose building process (from application of the fluid sealing inner liner to application of the cover) to be performed utilizing the same machine, saving time and negating the need for cranes. However, the solution has the disadvantage of there being a large distance between the point of fibre lay and the drums, which may cause entanglement of the reinforcing fibres, and an adversely large fibre braking force needs to be applied.

A further, frequently occurring source of problems is that braking reinforcing fibres is achieved by fibre "breaking" in addition to braking the unwinding drums. For instance, the strand laying assembly illustrated in FIG. 5b of document HU 183 565 (as above) is described in the corresponding explanation. This arrangement has several disadvantages, the first being strand braking. Braking action is provided in three different ways: first the strand let off drums brake, then the strand is braked electromagnetically, and finally it is braked utilizing a strand deforming means. Practical experience shows that this solution cannot provide equal braking for individual strands. Instead, due to inequalities of frictional forces and effects of wear and tear in the mechanism the strands will brake unevenly.

The preforming disc application has pointed projections (spikes) that excessively deform the strands causing damage to the strand-wire structure. Also, the pretreated surface of the wires may be damaged by friction over the spikes of the disc. The arrangement of the elastic pressing ring applied in this solution is also based on a mistaken concept, because due to its elasticity the pressing ring is unable to keep the hose under construction centred and allows the hose to move relative to the strand laying assembly. It can easily be discerned that if the centre line of the hose under construction does not coincide with the centre line of the fibre laying assembly, strands will be laid unevenly, with strands being laid over densely (even one wire above another) on one side and gaps between them on the other.

A common and very serious disadvantage of all previous solutions is that they do not provide a means for preventing reinforcing fibres from twisting while the reinforcing ply is being laid. This can result in technological problems arising during manufacture of high-pressure fibre reinforced hoses produced utilizing the solutions described above. There is also a danger that hoses thus produced may not behave as expected under mechanical loads in actual use.

Another key issue in building high-pressure fibre reinforced hoses is choosing the angle of lay of the reinforcing fibres. The angle of lay is measured from the cross section perpendicular to the hose axis.

Designing high-pressure hoses usually involves a careful design of the angle of lay of reinforcing fibres. For instance, according to a known solution slightly different angles of lay are applied for hoses with 2 and 4 plies, providing the average angle of lay is different from the so-called "equilibrium angle" by at least 10 minutes of arc. Document HU 198 781, and the corresponding U.S. Pat. No. 4,860,798 describe hoses comprising as many as 2, 4, 6, or even 8 spirally laid reinforcing plies. The angle of lay of the plies decreases significantly (from 55° to) 16° from the inside to the outside. The angle of lay is calculated by strict mathematical formulae that include elongation at break of the fibres. It is apparent that the angle of lay of the reinforcing fibre plies may vary to a great extent.

The reinforcing fibres may be made from steel, polymer-based fibre, glass fibre, and so on. To provide the necessary flexibility, reinforcing fibres are usually twisted from thinner fibres. Most commonly, reinforcing fibres are strands made of brass or zinc coated steel wires (other names for steel strands are steel cord and steel cable).

It is of crucial importance for the service life and strength of hoses that reinforcing fibres are laid in an ordered manner, providing uniform strength. The flexibility of the hose is poor if reinforcing fibres are laid too tightly (pressed together). This is because—due to the geometry of the hose—individual fibres will inevitably be displaced when the hose is bent. Fibres laid too tightly can cause premature failure if the application involves frequent flexing. In order to provide sufficient flexibility the number of fibres in each ply is chosen such that complete (100%) coverage is avoided, however keeping a uniform distance between reinforcing fibres is of crucial importance. If uniformity is not provided (and thus inter-fibre distances increase in certain regions) the danger of puncture type hose failure (failure of the hose wall without breaking the main reinforcing fibre plies) increases and thus the pressure holding capability of the hose deteriorates.

For the sake of uniform load bearing capacity of the reinforcing fibres in use it is also important to ensure that all reinforcing fibres are laid applying the same tensioning force. Otherwise some reinforcing fibres can overload, which leads to decreased overall load bearing capacity of the hose. Based on the above it is evident that the design of the mechanism for laying the reinforcing fibres on the hose under construction (henceforth referred to as the laying head) is crucially important.

The laying head has to lay the reinforcing fibres with uniform tension, and perform other functions during the hose manufacturing process, such as support and centre the hose under construction. (The support and centre functions will be detailed later in this specification.)

Practical experience shows that the behaviour of reinforcing plies made of twisted fibres is affected both by the laying direction and the angle of lay. If, for instance a strand having a right-hand twist (a Z twist) is laid on the hose under construction in a right-hand direction it will have a tendency to twist over (the amount of twist increases, and the strand may even "curl upon itself"). If, on the other hand, the same Z-twist strand is laid in a left-hand direction, it will have a tendency to untwist and loosen, leading to it being built into the hose with a loosened twist structure. Consequently the behaviour of the strands built into the hose will be different from that expected, resulting in the hose twisting under inner pressure and the load distribution of the reinforcing plies becoming uneven, leading to decreased pressure bearing capacity (i.e. lower burst pressure).

A possible solution to circumvent the above described difficulties is that reinforcing plies laid in a left-hand direction are made up of S-twist fibres, while plies laid in a right-hand direction include reinforcing fibres having Z-twist. This solution is not applied frequently since its implementation is cumbersome. The laying direction of reinforcing fibre must be switched over from ply to ply, which drastically decreases productivity whilst not preventing overtwisting (fibres curling upon themselves).

The object of the invention is to provide a method and apparatus that effectively removes the disadvantages described above.

Therefore the first objective is to provide a hose manufacturing method and apparatus where the spirally laid reinforcing fibres practically do not undergo twisting during the laying process.

The other objective of the invention is to ensure that the reinforcing fibres are laid uniformly, without applying an overly large braking force, in a manner allowing high productivity even in the case of multiple-ply hoses, without the need for aligning reinforcing fibres before laying each new ply is started.

The objectives of the invention are therefore accomplished by providing two distinct solutions, either of which may be applied separately. However the two solutions are preferably—at least in case of twisted reinforcing fibre strands—utilized together, since known laying heads are incapable of laying reinforcing fibres without twisting due to sharp directional changes ("breaking") of the fibre path and the frictional forces occurring at breaking points. The requirements of twist-free fibre laying and uniform fibre distribution are related in such a way that they are best satisfied if both are met at the same time.

The solution afforded by this invention can be used to lay reinforcing fibres of any material, such as steel or other metal wires, and fibres made from synthetic or natural polymers, but its specific advantages are best exploited when twisted reinforcing fibre strands are applied. Reinforcing fibre strands with a twisted structure are collectively referred to as strands. Some exemplary types of strand are the following: one- or multiple layer steel wires, steel cords, wire ropes having multiple twist, twisted or yarned fibres of cotton, polyester, polyamide, aramid, glass fibre, carbon fibre, etc.

By laying reinforcing fibre strands in a twist-free and uniform manner the characteristics of the hose, especially its pressure bearing capacity, will be improved. At the same time, since switching of strand twist direction between each ply is not necessary (contrary to hoses where left-handed plies are made of S-twist wires and right-handed ones are made of Z-twist wires), this invention allows high productivity.

The solution that accomplishes the first objective of the invention, namely, twist-free laying of the reinforcing fibres, is described in relation to a situation where the hose under construction undergoes rotating motion about its own axis, while the laying head advances in the direction of the axis of the hose.

The first objective is accomplished by rotating the drums about two axes. On the one hand, the drums are rotated about their own axis of rotation (let us call that axis A) by pulling off the fibre applied for building the reinforcing ply, and on the other hand the drums are also rotated about an axis set perpendicular to their own (let us call that axis B). Axis B is substantially parallel with the direction in which the fibre is unwound from the drum. The drums are rotated about axis B in the same direction as the direction of rotation of the hose under construction. Drums are rotated about axis A by the fibre unwinding force, whereas axis B is forced to rotate by a drive.

Since, as already mentioned, only relative movements have significance for the present invention, it can be formulated that the hose under construction is simultaneously rotated and moved forward relative to the laying head, or in other words, the hose undergoes both rotary and advancing motion during the hose-building process.

With this invention the drums are rotated utilizing controllable-speed drive, with a speed depending on the rpm N of the hose under construction and the angle of lay $\alpha$. The angle of lay $\alpha$ of the reinforcing ply is measured from the cross section perpendicular to the hose axis.

Our theoretical calculations show that, if the angle of lay of the ply is $\alpha$, untwisting or overtwisting of the strand can be prevented if the rpm of the unwinding drums about axis B (n), and the rotational speed N of the hose about its own axis are in a relation expressed by the following formula:

$$n = N \sin \alpha \qquad (1)$$

The above may also be expressed by stating that the preferred way of carrying out the inventive method is that the drums are rotated in a controlled manner, with a speed determined by the laying speed, angle and diameter.

Using the inventive method, the drums are rotated about axis B with a speed approximately corresponding to that calculated using formula (1), such that the drums are rotated about axis B in the same direction as the hose is rotated about its own axis. Accordingly the speed of rotation of the drums about axis B differs at most by 20% from the value calculated using formula (1):

$$0.8N \sin \alpha \leq n \leq 1.2N \sin \alpha \qquad (2)$$

Practical experience, supported by theoretical calculations, shows that the behaviour of the hose is affected more by strand untwisting than overtwisting. If multilayer strands have both S-twist and Z-twist layers, the twist direction of the outermost layer has a decisive effect on the behaviour of the hose. If reinforcing plies with fibre strands have a double-twisted structure (e.g. wire ropes, yarns etc.) the direction of the second twist has the decisive effect. Thus, it can be maintained that the method used by the invention is carried out even if the drums are rotated about axis B only in case of those strands of which the direction of the twist of the outermost layer, or (in case of multiple-twist strands) the direction of the final twist is opposite to the direction in which the reinforcing ply is laid. Since the advantageous effects of the invention are at least partially achieved, the method is also considered to be successful if—although the direction of rotation of the drums corresponds to the invention—the speed of rotation differs from that determined by formula (I).

We have recognised that since frictional forces hindering the effect of drum rotation will occur even in the most meticulously designed, directional break-free fibre path, the rotation of the drums about axis B will only have an effect at the hose surface if the torque generated by rotation is able to overcome frictional forces occurring in the laying mechanism. Therefore, the preferred way of carrying out the inventive method is that rotation of the drums about axis B is started before starting the axial movement of the laying head.

Rotation of the drums about the second axis B may be implemented utilizing several solutions already known, such as driving each drum individually applying frequency-converter drive units, or mutually driving more than one drums by a drive chain, V-belt, etc.

The inventive method for building hoses reinforced with spirally laid fibres—where the hose under construction undergoes both rotation and advancing motion relative to the laying head, and where the reinforcing fibres are unwound from drums—is characterised by the drums being rotated about two axes, the first axis being the principal axis of the drums and the second axis being nearly parallel with the direction in which the fibres are unwound, where the direction of rotation of the drums about the second axis is the same as the direction in which the hose under construction is rotated.

The inventive method means that the strands have a strand direction opposite to the strand direction of the reinforcing ply currently being laid, applied such that the drums are rotated about an axis nearly parallel with the direction in which the fibres are unwound.

The rate of rotation n of the drums (14) about the axis nearly parallel with the direction in which the fibre is unwound is approximately the product of the rotational speed N of the hose under construction and the sine of the angle of lay $\alpha$, where the rotational speed of the drums n is taken relative to the laying head.

$$n \approx N \sin \alpha.$$

Preferably the rotational rate n of the drums about the axis nearly parallel with the direction in which the fibre is unwound differs by at most 20% from the product of the rotational speed N of the hose under construction and the sine of the angle of lay $\alpha$, where the rotational speed of the drums n is taken relative to the laying head.

$$0.8N \sin \alpha \leq n \leq 1.2N \sin \alpha.$$

Since frictional forces hindering the effect of drum rotation will occur even in case of a meticulously designed, directional break-free fibre path, the rotation of the drums in a direction corresponding to the ply direction of a reinforcing ply to be built is preferably started before the building of the reinforcing ply begins to ensure that the effect of rotation fully applies as soon as the hose building process is started.

A further object of the invention is a method for building hoses reinforced with spirally laid fibres, where the hose under construction undergoes both rotation and advancing motion relative to the laying head, and where the reinforcing fibres are unwound from drums through a circular fibre guide, the method being characterised by the reinforcing fibres being laid on the hose surface through a rotating self-adjusting circular fibre guide arranged substantially coaxially with the hose. With the self-adjusting circular fibre guide the emphasis is on the self-adjusting capability since through it the fibre guide overcomes the disadvantages of prior apparatus detailed above in relation to the preforming disc.

The inventive method is carried out such that during the laying of reinforcing fibres the hose is centred in the laying head utilizing sliding centring shoes arranged to move in a radial direction.

With the inventive method the reinforcing plies are fixed by compression force between a stationary ring and a sleeve, the latter moves in an axial direction after laying has been completed, where the sleeve and the stationary ring are arranged substantially concentrically with the hose. After fixing the fibres the ends are cut.

Another feature of the invention is an apparatus for carrying out a method of building hoses reinforced with spirally laid fibres, where the hose under construction undergoes both rotation and advancing motion relative to the laying head, and where the reinforcing fibres are unwound from drums through a circular fibre guide, characterised by the drums being able to rotate about two nearly perpendicular axes, where the rotation of one axis is driven and is set substantially parallel with the direction in which the fibres are unwound.

The rotational speed—about the axis nearly parallel with the longitudinal axis of the hose—of the drums is variable, and the relative rate of rotation of the drums, about the axis set substantially parallel with the direction in which the fibres are unwound, can be proportionally synchronized to the speed of rotation of the hose.

The scope of the present invention includes an apparatus for building hoses reinforced with spirally laid fibres, where the hose under construction undergoes both rotation and advancing motion relative to the laying head, and where the reinforcing fibres are unwound from drums and are passed through a circular fibre guide, characterised by having a rotating self-adjusting circular fibre guide arranged substantially coaxially with the hose.

The apparatus of the invention has centring shoes adapted for sliding along the surface of the reinforcing fibres, where said centring shoes are arranged to move in a radial direction.

The apparatus also has a rotary ring adapted for facilitating the ordered and unobstructed advance of the reinforcing fibres.

The apparatus comprises a sleeve adapted for separating the ends of the reinforcing fibres from the hose under construction, said sleeve being arranged coaxially with the hose in an axially movable manner.

The apparatus has a support roller arranged to move in a vertical direction.

Figure 4:
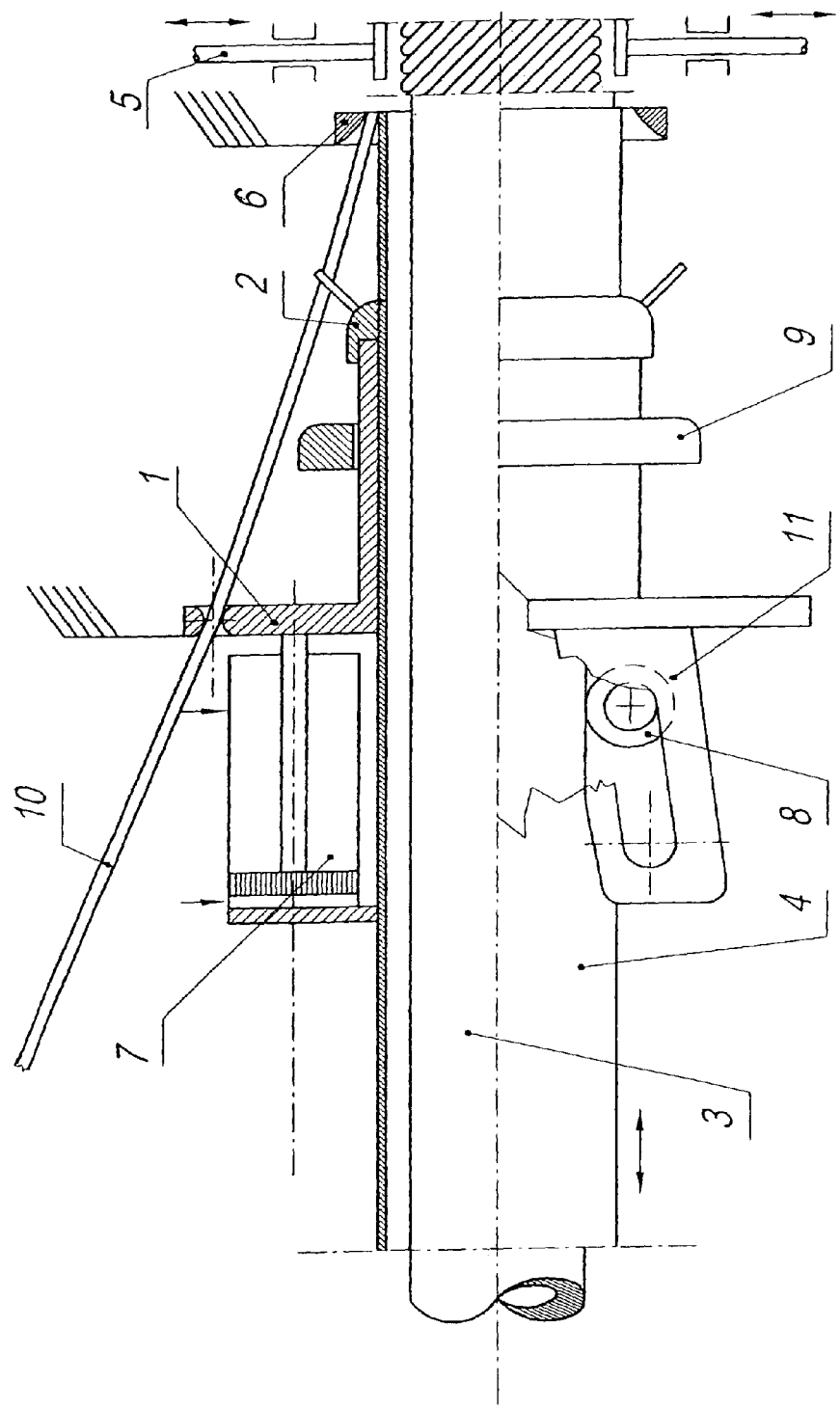

For easier understanding of its advantages, the inventive solution is described in greater detail referring to the accompanying drawings where FIG. 1 shows the schematic side view of the hose building machine, FIGS. 2a and 2b show views of the fibre unwinding drum rotatable about two different axes, and FIGS. 3 and 4 show cross-sectional views of the laying head in different stages of operation.

FIG. 1 shows a schematic side view of a possible use of the hose building machine. According to this schematic the hose under construction is rotated about its own axis while the laying head advances along the direction of the same axis.

The invention is, however, not restricted to this use and since only relative motions of the specific elements (rather than motions related to the ground) have significance as far as the solution is concerned, the invention may be applied if the hose under construction undergoes both rotation and advancing motion, or the drums are rotated around the hose, or in any combination of these.

In the arrangement shown in FIG. 1 the hose under construction 3 undergoes rotation relative to the laying head 12, with the laying head 12 and the drum support platform 15 applied for holding the drums 14 moving in a direction parallel with the longitudinal axis of the hose. The laying head 12 is described referring to FIGS. 3, 4 where it is illustrated in greater detail. FIG. 1 only shows the location of the laying head 12. The hose under construction 3 is rotated by a rotator mechanism 13. The reinforcing fibres 10 are unwound from drums 14 adapted for rotation about two different axes, and are passed through the bores of an aligner post 19. The aligner post 19 moves together with the drum support platform 15. The drums 14 are rotated about their axis B by an adjustable-speed electric motor 16 via a drive chain 16 and gears 17. FIG. 2 shows two views illustrating the rotary movement of the drum 14 about axes A and B.

The arrangement and operation of the laying head 12 that allows the accomplishment of the other aim of the invention i.e. the even, uniform laying of the reinforcing plies is described with reference to FIGS. 3, 4. FIG. 3 shows the laying head 12 during the ply laying operation stage, while in FIG. 4 it is shown between two subsequent ply laying operations.

The apparatus comprises at least one circular fibre guide 1 known per se and a self-adjusting circular fibre guide 2, both of which are arranged substantially coaxially with the hose under construction 3. The circular fibre guide 1 and the self-adjusting circular fibre guide 2 contain fibre guide openings arranged in a circular symmetrical configuration, in a number corresponding to the number of fibres being laid. The apparatus also comprises at least two centring shoes 5.

The reinforcing fibres 10 (for instance steel wire strands) are guided into a circular fibre guide 1 (or in other terms, a circular aligner) and then passed through a self-adjusting circular fibre guide 2 that is able to freely rotate in 360 degrees in a self adjusting manner to allow the fibres to pass unrestricted and is arranged nearly coaxially with the hose under construction 3. The reinforcing fibres 10 are subsequently laid on the surface of the hose under construction 3. The centring shoes 5, adapted for sliding along the surface of the reinforcing ply already laid, are applied to keep the hose in a centred position. The centring shoes are moved in a coordinated manner to ensure that the hose is always kept at the theoretical centre line of the apparatus.

The sleeve 4, arranged such that it is movable along the length of the hose by means of two pneumatic cylinders 7 relative to the circular fibre guide 1 that is fixed with respect to the laying head 12, is included to perform a special function. As the sleeve 4 moves, a support roller 8 attached thereto is made to move up and down by cam slots 11 connected to the circular fibre guide 1 on each side. Since thin and vulnerable elastomeric layers are usually applied between reinforcing plies, the support roller 8 is applied for keeping the hose 3 centred between two ply laying stages, when the laying head 12 is being returned to its initial position to be able to start laying the next reinforcing ply, while the centring shoes 5 are removed from the surface of the hose. The support roller 8 rolls along the surface of the hose under construction 3 and thereby does not damage the elastomeric layer. (In contrast to the sliding centring shoes 5 that could cause damage through sliding friction.) After the laying head 12 is returned to its initial position the above steps may be repeated to produce another reinforcing ply.

The sleeve 4 performs another function in its forward pushed state during the returning of laying head 12. As the sleeve, is pushed forward after laying a reinforcing ply, the fibres are fixed in the gap between the sleeve 4 and the stationary ring 6. When the fibres are firmly secured they are cut off along the entire periphery of the hose, or in other words they are separated from the reinforcing ply just produced. The laying system may subsequently be returned to the starting end of the hose under construction for producing another reinforcing ply.

The rotary ring 9 has an important function. The rotary ring 9 is applied for supporting the reinforcing fibres 10 while not allowing them to get twisted around the cylindrical portion of the tread guide 1. The freely rotating arrangement of the rotary ring 9 allows for reduced frictional resistance to the reinforcing fibres 10.

It should be emphasised that—in sharp contrast to the current practice of manufacturers—the laying apparatus hereinbefore discussed is arranged such that it deforms reinforcing fibres to the least possible extent and has a minimal frictional resistance. In such an arrangement the tensile force occurring in the reinforcing fibres is essentially determined by the controlled braking of the drums 14, with the effect of uncontrolled forces (different for each fibre) being placed on it to only a minimum extent. Thereby all reinforcing fibres are built into the hose with an equal amount of pre-tensioning, which has significant consequences for the service life and load bearing capacity of the hose. Keeping the deformation of reinforcing fibres at a minimum also prevents excessive deformation of the strand structure during hose building, which adversely affects the strength of the hose, and which occurs frequently in known hose manufacturing machines. A low level of deformation and low frictional resistance lowers the level of damage to pretreated (coated) surfaces of reinforcing fibres and therefore does not impede adhesion to the embedding layer.

Use of the invention is explained in greater detail below by a non-restrictive example.

EXAMPLE

A liner from uncured rubber sheet was first produced on a mandrel having a diameter of 90 mm, and then the load distributing rubberized textile layers were added. The mandrel had only rotary motion in the hose building machine. The reinforcing fibres 10 (in this particular case, steel wire strands) had a diameter of 3.6 mm, brass coating, Z twist, and a tensile strength above 18.000 N per fibre, strand. The wire strands were unwound from braked drums with a diameter of 250 mm. The drums had been mounted in a manner shown in FIG. 1 on vertical poles forming the drum support platform 15. The drums were rotated about their axis B by variable speed electric motors synchronized with the rotator mechanism 13 of the mandrel. The ratio of the speed of the motor applied for rotating the mandrel and the rotational speed of the drums was adjustable. The poles of the drum support platform 15, as well as the laying head 12, were moved parallel with the axis of the hose under construction 3 on a rail track. The movement was synchronized with the motor rotating the mandrel. The wire strands were laid in two layers at an angle near the so-called equilibrium angle (35.26 degrees measured from the cross section perpendicular to the hose axis). The rotational rate of the drums about the axis B was set such that the drums completed 0.52 turns for each revolution of the mandrel in the same direction as the mandrel was rotated. The wire strands unwound from the drums were passed through the circular fibre guide 1 and the rotating self-adjusting circular fibre guide 2 that had fibre guide openings corresponding in number to the number of wire strands. The hose under construction 3 was kept in place by the centring shoes 5. After the first wire layer had been laid, the sleeve 4 was pressed forward applying a pneumatic cylinder, and the wire strands were fixed in the gap between the sleeve 4 and the stationary ring 6. The wire strands were cut off at the stationary ring 6, or in other words they were separated from the finished reinforcing ply, and the laying mechanism was returned to its initial position. Subsequently an embedding rubber layer was added to the hose and a second wire layer was laid opposite to the first layer. In a manner similar to the first wire layer, the drums 14 completed 0.52 turns about the axis B in the same direction as the mandrel was rotated for each revolution of the mandrel. Finally a rubber cover was laid on the hose, and the hose was wrapped in a polyamide textile tape and vulcanised in a steam boiler. The burst pressure of the hose thus manufactured was 969 bars, more than 10% higher than the burst pressure (878 bars) of a hose produced utilizing the same type of wire strand but without rotating the drums about the axis B.

The invention claimed is:

1. A method for building hoses reinforced with spirally laid twisted fibre strands, where the hose under construction undergoes both rotation and advancing motion relative to the laying head, and where the reinforcing twisted fibre strands are unwound from drums, and the drums are rotated about two axes, the first axis being the principal axis of the drums and the second axis being nearly parallel with the direction in which the twisted fibre strands are unwound, wherein the rotational speed n of the drums about the second axis nearly parallel with the direction in which the twisted fibre strand is unwound is approximately the product of the rotational speed N of the hose under construction and the sine of the angle of lay $\alpha$, where the rotational speed of the drums n is taken relative to the laying head, $$n \approx N \sin \alpha$$

and the direction of rotation of the drums about the second axis is the same as the direction in which the hose under construction is rotated.

2. The method according to claim 1, wherein rotation of drums about an axis nearly parallel with the unwinding direction of twisted fibre strands is applied only in case of those plies in which the twist direction of the outermost layer of the twisted fibre strand strands is opposite to the twist direction of the ply that is being laid.

3. The method according to claim 1, wherein the rotational speed n of the drums about the axis nearly parallel with the direction in which the twisted fibre strand is unwound differs by at most 20% from the product of the rotational speed N of the hose under construction and the sine of the angle of lay $\alpha$, where the rotational speed of the drums n is taken relative to the laying head, $$0.8N \sin \alpha \leq n \leq 1.2N \sin \alpha.$$

4. The method according to claim 1, wherein the rotation of the drums in a direction corresponding to the ply direction of a reinforcing ply to be built is started before the building of the reinforcing ply begins.

5. The method according to claim 1, wherein the reinforcing twisted fibre strands are laid on the hose surface through a rotatable self-adjusting circular fibre guide arranged substantially coaxially with the hose.

6. The method according to claim 1, characterised wherein during the laying of reinforcing twisted fibre strands the hose is centred In the laying head utilizing sliding centering shoes arranged to be moved in a radial direction.

7. The method according to claim 1, further comprising fixing the reinforcing plies in a gap between a stationary ring and a sleeve moved in an axial direction after laying has been completed, where the sleeve and the stationary ring are arranged substantially concentrically with the hose, and subsequently cutting the twisted fibre strand ends.

8. The method according to claim 7, wherein the ends of the reinforcing fibres are separated from the hose under construction by the said sleeve, the sleeve being arranged coaxially with the hose in an axially movable manner.

9. A method for building hoses reinforced with spirally laid twisted fibre strands, the method comprising:
   rotating and advancing a hose under construction relative to a laying head; and
   unwinding reinforcing twisted fibre strands from drums by rotating the drums about first and second axes at a rotation speed n, the first axis being a principal axis of the drums and the second axis being nearly parallel with a direction in which the twisted fibre strands are unwound;
   wherein the rotational speed n of the drums about the second axis nearly parallel with the direction in which the twisted fibre strands are unwound is approximately a product of a rotational speed N of the hose under construction and a sine of the angle of lay $\alpha$, where the rotational speed n of the drums is taken relative to the laying head, and the direction of rotation of the drums about the second axis is the same as the direction in which the hose under construction is rotated.

* * * * *